(12) United States Patent
Rolfes et al.

(10) Patent No.: US 9,510,705 B2
(45) Date of Patent: Dec. 6, 2016

(54) PRE-PACKAGED BEVERAGE BREWER PRESS

(76) Inventors: Patrick J. Rolfes, Corona Del Mar, CA (US); John Guy Cazort, III, Corona Del Mar, CA (US)

(*) Notice: Subject to any disclaimer, the term of this patent is extended or adjusted under 35 U.S.C. 154(b) by 826 days.

(21) Appl. No.: 13/066,300

(22) Filed: Apr. 13, 2011

(65) Prior Publication Data
US 2012/0260806 A1 Oct. 18, 2012

(51) Int. Cl.
*A47J 31/18* (2006.01)
*A47J 31/20* (2006.01)
*A47J 31/38* (2006.01)

(52) U.S. Cl.
CPC .................. *A47J 31/38* (2013.01)

(58) Field of Classification Search
CPC .. A47J 31/46; A47J 31/4403; A47J 31/3633; A47J 31/36; A47J 31/3609; A47J 31/3614; A47J 31/3623; A47J 31/3666; A47J 31/368; A47J 31/3685; A47J 31/44
USPC ........................................ 99/279, 285, 485
See application file for complete search history.

(56) References Cited

U.S. PATENT DOCUMENTS

| | | | |
|---|---|---|---|
| 211,236 A * | 1/1879 | Hartman | 99/287 |
| 802,378 A * | 10/1905 | Ellis | 99/305 |
| 881,562 A * | 3/1908 | Ellis | 99/319 |
| 955,616 A * | 4/1910 | Tava | 366/331 |
| 1,499,281 A * | 6/1924 | Altieri | 99/306 |
| 1,751,397 A * | 3/1930 | Delsuc | 99/306 |
| 1,843,241 A * | 2/1932 | Pouget | 99/285 |
| 2,107,924 A * | 2/1938 | Adams | 99/281 |
| 2,400,613 A * | 5/1946 | Strahm | 99/319 |
| 2,529,395 A * | 11/1950 | Hummel | 99/302 P |
| 2,601,821 A * | 7/1952 | Johnson | 99/287 |
| 2,783,703 A * | 3/1957 | Brown | 99/283 |
| 3,022,411 A * | 2/1962 | Soper et al. | 219/441 |
| 3,075,453 A * | 1/1963 | Wagner et al. | 99/285 |
| 3,120,170 A * | 2/1964 | Garte | 99/287 |
| 3,217,923 A * | 11/1965 | Price | 220/663 |
| 3,224,360 A * | 12/1965 | Wickenberg et al. | 99/292 |
| 3,316,388 A * | 4/1967 | Wickenberg et al. | 219/442 |
| 3,343,478 A * | 9/1967 | Hausam | 99/283 |
| 3,405,630 A * | 10/1968 | Weber, III | 99/282 |
| 3,596,806 A * | 8/1971 | Harschel | 222/190 |
| 3,657,993 A * | 4/1972 | Close | 99/297 |
| 3,695,168 A * | 10/1972 | Van Brunt | 99/306 |
| 3,757,670 A * | 9/1973 | Laama et al. | 99/302 R |
| 3,844,206 A * | 10/1974 | Weber | 99/282 |
| 3,958,502 A * | 5/1976 | Vitous | 99/300 |
| 4,164,644 A * | 8/1979 | Remsnyder et al. | 219/433 |

(Continued)

*Primary Examiner* — Eric Stapleton
(74) *Attorney, Agent, or Firm* — Gordon K. Anderson

(57) ABSTRACT

A pre-packaged beverage brewer press is taught that incorporates a hollow cylinder (20) having a full diameter body (22), an open top (24) and a closed bottom (26) with a removable holder (36) engaging the cylinder bottom. The holder has a configuration suitable to retain a beverage cartridge (40), with the holder having at least one exit opening (46) therein. A removable manually operated piston (74) is configured to be engaged within the hollow cylinder and includes an air-tight seal and an outwardly extended top (76). A cup (98), having a wide flat bottom for standing evenly on a flat surface, is attached to the cylinder bottom. When heated water is placed within the cylinder and the piston is inserted into the cylinder and urged downwardly by a user, sufficient pressure is created to compress the water into the beverage cartridge permitting steeping therefore brewing a beverage which is discharged into the cup attached beneath.

3 Claims, 5 Drawing Sheets

(56) References Cited

U.S. PATENT DOCUMENTS

| | | | |
|---|---|---|---|
| 4,516,484 A * | 5/1985 | De Ponti | 99/279 |
| 4,557,187 A * | 12/1985 | DePonti | 99/279 |
| 4,603,621 A * | 8/1986 | Roberts | 99/307 |
| 4,621,571 A * | 11/1986 | Roberts | 99/280 |
| 4,703,687 A * | 11/1987 | Wei | 99/286 |
| 4,852,472 A * | 8/1989 | In-Albon et al. | 99/289 R |
| 4,867,880 A * | 9/1989 | Pelle et al. | 210/474 |
| 4,934,257 A * | 6/1990 | Mikkelsen | 99/279 |
| 4,998,463 A * | 3/1991 | Precht et al. | 99/300 |
| 5,000,082 A * | 3/1991 | Lassota | 99/304 |
| 5,046,409 A * | 9/1991 | Henn | 99/307 |
| 5,242,702 A * | 9/1993 | Fond | 426/433 |
| 5,312,637 A * | 5/1994 | Midden | 426/433 |
| 5,325,765 A * | 7/1994 | Sylvan et al. | 99/295 |
| 5,478,586 A * | 12/1995 | Connor | 426/431 |
| 5,570,623 A * | 11/1996 | Lin | 99/285 |
| 5,632,194 A * | 5/1997 | Lin | 99/285 |
| 5,636,563 A * | 6/1997 | Oppermann et al. | 99/285 |
| 5,755,149 A * | 5/1998 | Blanc et al. | 99/289 T |
| 5,776,527 A * | 7/1998 | Blanc | 426/77 |
| 5,840,189 A * | 11/1998 | Sylvan et al. | 210/474 |
| 5,943,946 A * | 8/1999 | Chen | 99/297 |
| 6,026,732 A * | 2/2000 | Kollep et al. | 99/295 |
| 6,053,092 A * | 4/2000 | Anderson | 99/275 |
| D431,423 S * | 10/2000 | Ohm et al. | D7/620 |
| 6,182,554 B1 * | 2/2001 | Beaulieu et al. | 99/289 R |
| 6,189,438 B1 * | 2/2001 | Bielfeldt et al. | 99/321 |
| 6,250,208 B1 * | 6/2001 | Helps et al. | 99/299 |
| 6,553,894 B1 * | 4/2003 | Hamon et al. | 99/286 |
| 6,561,080 B1 * | 5/2003 | Feeney | 99/319 |
| 6,655,260 B2 * | 12/2003 | Lazaris et al. | 99/295 |
| 6,708,600 B2 * | 3/2004 | Winkler et al. | 99/295 |
| 6,727,484 B2 * | 4/2004 | Policappelli | 219/689 |
| 6,740,345 B2 * | 5/2004 | Cai | 426/77 |
| 6,758,364 B1 * | 7/2004 | Rohrig | 220/714 |
| 7,210,401 B1 * | 5/2007 | Rolfes et | 99/289 R |
| 7,320,274 B2 * | 1/2008 | Castellani | 99/295 |
| 7,337,714 B2 * | 3/2008 | Mazzer | 100/126 |
| 7,389,720 B2 * | 6/2008 | Haverstock | 99/297 |
| 7,469,628 B2 * | 12/2008 | Mandralis et al. | 99/295 |
| D594,267 S * | 6/2009 | Bodum | D7/319 |
| 7,559,274 B2 * | 7/2009 | Wilhite | 99/297 |
| 7,562,618 B2 * | 7/2009 | Jarisch et al. | 99/289 R |
| 7,677,158 B2 * | 3/2010 | McDuffie et al. | 99/302 R |
| 7,703,380 B2 * | 4/2010 | Ryser et al. | 99/295 |
| 7,730,829 B2 * | 6/2010 | Hammad | 99/295 |
| 7,849,784 B2 * | 12/2010 | Adler | 99/297 |
| 7,856,920 B2 * | 12/2010 | Schmed et al. | 99/295 |
| 7,861,646 B2 * | 1/2011 | Bockbrader | 99/323.3 |
| 7,946,217 B2 * | 5/2011 | Favre et al. | 99/295 |
| 8,210,096 B2 * | 7/2012 | Fin | 99/295 |
| 8,256,342 B2 * | 9/2012 | Jarisch et al. | 99/289 R |
| 8,313,644 B2 * | 11/2012 | Harris et al. | 210/198.1 |
| 8,336,447 B2 * | 12/2012 | Jarisch et al. | 99/289 R |
| 2002/0035929 A1 * | 3/2002 | Kanba et al. | 99/279 |
| 2002/0104442 A1 * | 8/2002 | Maxwell et al. | 99/287 |
| 2002/0144604 A1 * | 10/2002 | Winkler et al. | 99/302 R |
| 2002/0148356 A1 * | 10/2002 | Lazaris et al. | 99/295 |
| 2004/0118290 A1 * | 6/2004 | Cai | 99/275 |
| 2005/0236323 A1 * | 10/2005 | Oliver et al. | 210/464 |
| 2005/0257695 A1 * | 11/2005 | Dobranski et al. | 99/485 |
| 2005/0266122 A1 * | 12/2005 | Franceschi | 426/77 |
| 2006/0130665 A1 * | 6/2006 | Jarisch et al. | 99/279 |
| 2006/0254428 A1 * | 11/2006 | Glucksman et al. | 99/302 P |
| 2007/0062375 A1 * | 3/2007 | Liverani et al. | 99/279 |
| 2007/0144356 A1 * | 6/2007 | Rivera | 99/295 |
| 2007/0175334 A1 * | 8/2007 | Halliday et al. | 99/279 |
| 2007/0175335 A1 * | 8/2007 | Liverani et al. | 99/279 |
| 2007/0175927 A1 * | 8/2007 | Ozanne et al. | 222/334 |
| 2009/0017177 A1 * | 1/2009 | Yoakim et al. | 426/431 |
| 2009/0229472 A1 * | 9/2009 | Ferrara, Jr. | 99/323 |
| 2010/0083843 A1 * | 4/2010 | Denisart et al. | 99/295 |
| 2010/0116143 A1 * | 5/2010 | Cerroni | 99/297 |
| 2011/0117248 A1 * | 5/2011 | Rivera | 426/77 |

* cited by examiner

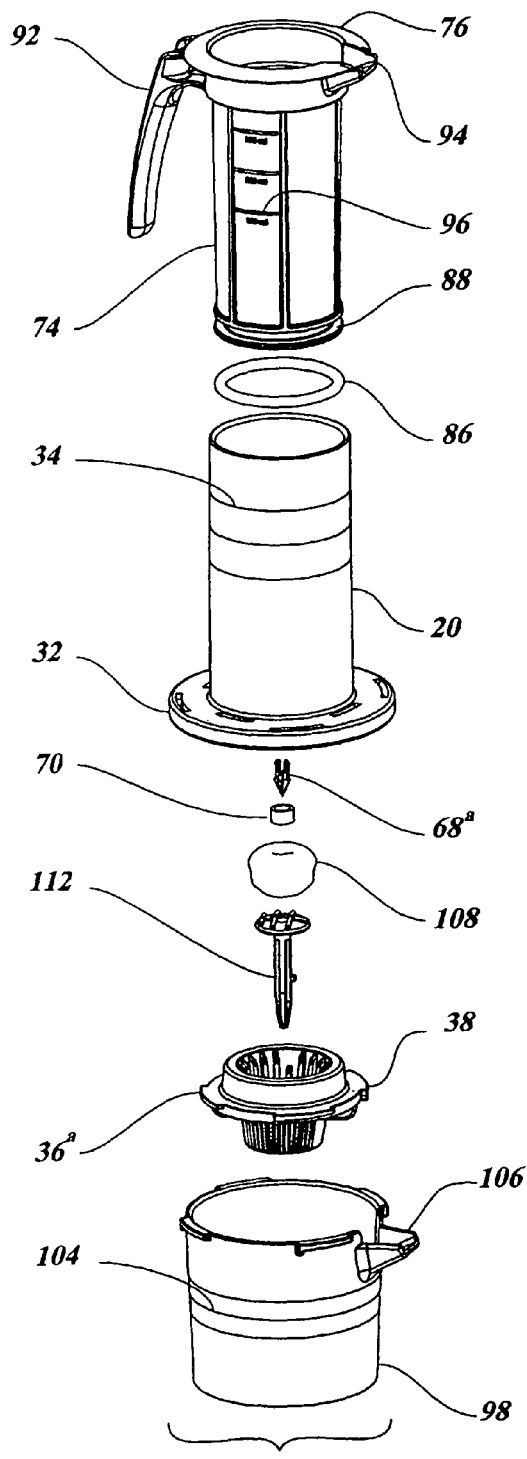
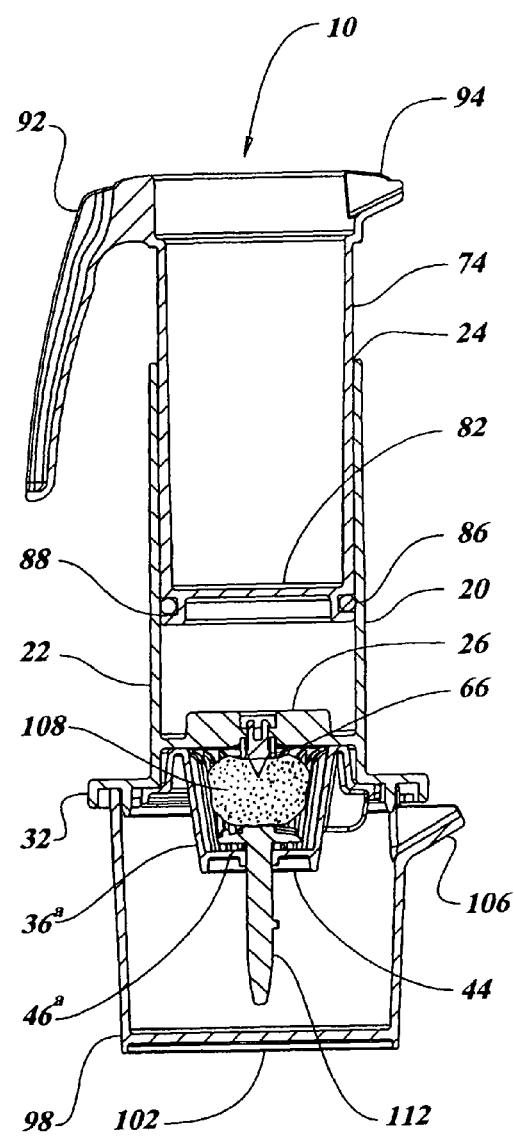
FIG.5
FIG.6

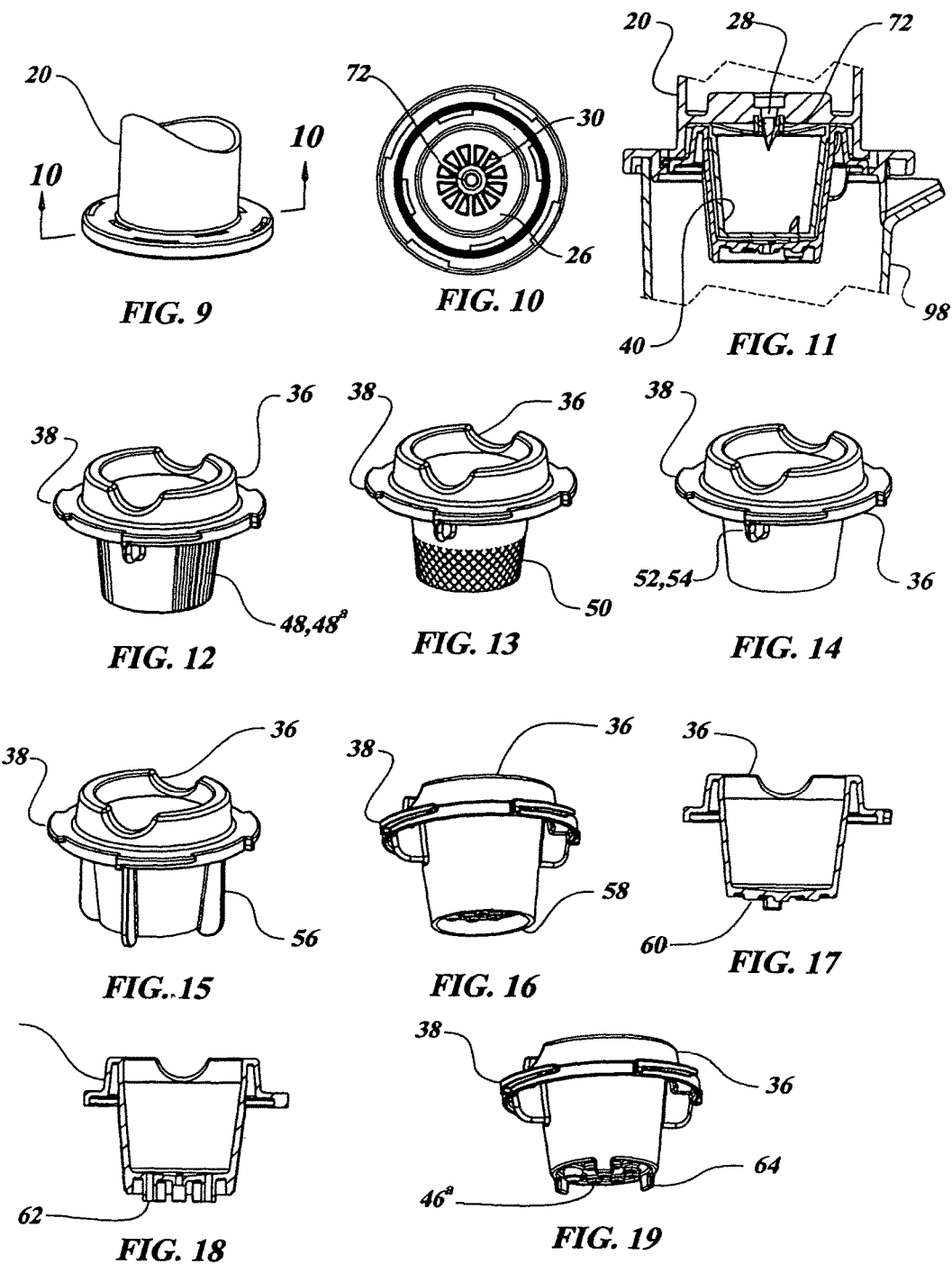

PRE-PACKAGED BEVERAGE BREWER PRESS

TECHNICAL FIELD

The present invention relates to beverage brewers in general, more specifically to a manual press for brewing single cup coffee and tea, utilizing a pre-packaged beverage cartridge.

BACKGROUND ART

Previously, many types of beverage makers have been used in endeavoring to provide an effective means to brew a beverage using the press technique to force hot water through the brewing media under pressure to gain body, richness etc.

The prior art listed below did not disclose patents that possess any of the novelty of the instant invention; however the following U.S. patents are considered related:

| Pat. No. | Inventor | Issue Date |
| --- | --- | --- |
| 7,337,714 B2 | Mazzer | Mar. 4, 2008 |
| D566,454 S | Bodum | Apr. 15, 2008 |
| D573,369 S | Gauss | Jul. 22, 2008 |
| 7,389,720 B2 | Haverstock | Jun. 24, 2008 |
| D594,267 S | Bodum | Jun. 16, 2009 |
| 7,677,158 B2 | McDuffie et al. | Mar. 16, 2010 |
| 7,849,784 B2 | Adler | Dec. 14, 2010 |
| 7,856,920 B2 | Schmed et al. | Dec. 28, 2010 |

Mazzer in U.S. Pat. No. 7,337,714 B2 teaches an apparatus for pressing coffee which includes a base and housing supporting a filter cup and a pressing cylinder. The cylinder engages a cylindrical body attached to a rocker arm with a counterweight. A rack and gear activate a lever causing the body to press the cylinder.

U.S. Pat. No. 7,389,720 B2 issued Haverstock is for a press used with a disposable cup. A resilient seal is used between a filter and the cup. A detachable rod permits the user to press downwardly to the bottom of the cup where the infusion substance is trapped.

McDuffie et al. in U.S. Pat. No. 7,677,158 B2 discloses a beverage maker allowing a user to brew a beverage or dispense hot water. Sealing and latching mechanisms seal the chamber under pressure. A mechanism is provided for reducing splashing when relatively short vessels are positioned beneath the brewing chamber.

Adler in U.S. Pat. No. 7,849,784 B2 teaches a coffee or tea filtering press which includes a hollow cylinder having top and bottom openings and a perforated removable cap which encloses the bottom opening. A removable piston is inserted into the top opening and pressed downward to force liquid thru the perforated cap and a support is provided to hold the press above the mouth of an open vessel U.S. Pat. No. 7,856,920 B2 issued to Schmed et al. is for a coffee maker for brewing powered coffee contained in a cartridge with a brewing chamber provided for receiving the cartridge. A punching member and a pump feed brewing water into the chamber. In order to avoid froth, means for restricting water is provided per unit of time permitting water flow through the cartridge essentially unpressurized.

For background purposes and as indicative of the art to which the invention is related reference may be made to the remaining cited U.S. design Pat. D566,454 S, D573,369 S and D594,267 S issued to Bodum, Gauss and Bodum respectively.

DISCLOSURE OF THE INVENTION

Pre-packaged beverage cartridges have become popular for single cup brewing of beverages, in particular coffee and tea, and have been widely used throughout the world. The cartridge is easily handled and expedient to use and conveniently discarded. The French press method of coffee making has been known and used for a considerable period of time for improving the qualities of the brew. A long felt need has existed to combine the two approaches together to provide the popular French press capacities for single cup brewing using the well accepted pre-packaged beverage cartridges without the requirement of an expensive mechanical or automated apparatus.

Yet another object of the invention is directed to the flexibility of the press as it is possible to replace the cylinder and piston with commercially available components already on the market and still retain the same functional capabilities with only a slight modification to the interface of the outwardly extending base. Such cylinders are usually cylindrical and are open on each end however a bottom may be easily included in the interface modification. This feature still permits the primary object of the invention to be realized which is to provide a single cup small portable press using a pre-packaged beverage cartridge.

It is therefore the primary object of the invention to provide a single cup small portable press that accesses a beverage cartridge requiring only the addition of hot water with the pressure provided by manual force which is well within the capabilities of all.

An important object of the invention is the design of the cylinder receiving the hot water for the brewing process which incorporates level marking visually permitting the desired amount of water to be added. An outwardly extending base is included on the bottom for attachment purpose and also to provide a flat surface for upright seating when cleaning the cylinder.

Another object of the invention is the use of a separate holder for the beverage cartridge, for the desired type of product the user wishes to use. The holders may be procured separately without the complete brewer press. The holder includes upright seating provisions permitting the holder to sit on a flat surface when cleaning. A convenient outside gripping surface is provided as the holder attaches under the cylinder with ramped flanges requiring only a simple eighth turn rotational twist. When the brewing is completed the self contained cup type beverage cartridge is easily removed by hand and for the filter paper type pod cartridge an ejector pin is provided operated by pressing the pin with ones thumb expelling the cartridge from the holder without touching the spent cartridge.

Another object of the invention is the use of a piston inserted into the top of the cylinder which is intuitively obvious to understand its function. The piston is available in two optional embodiments first with a closed top, in an ergonomic dome shape, and the second with an open top, a handle, a pouring spout and water level markings. The second optional piston has the capabilities of receiving a measured amount of hot water and pouring the water from the spout directly into the open top of the cylinder. In either option the piston utilizes a free floating O-ring which permits a water tight seal between the piston and the cylinder creating the optimum amount of pressure since the groove for the O-ring is oversized in depth allowing it to marginally slide within the groove as to not create excessive friction.

A cup is attached to the cylinder creating still another object of the invention as it is attached directly to the outwardly extending base of the cylinder with ramped flanges. When heated water is placed in the cylinder, the piston inserted and urged downwardly by a user, sufficient pressure is created to compress the water into the beverage cartridge permitting steeping and brewing a beverage which is discharged into the cup attached beneath. The cup, being sturdy and an integral part of the invention, creates a firm platform since the cup bottom is flat and wide enough to be stable and secure when pressure is applied from above. Further the cup contains level markings and a pouring spout permitting it to be used for pouring hot water into the cylinder when employed in conjunction with the closed top piston option. In either event the brewed liquid received in the cup may be poured into a conventional coffee cup, a teacup or mug etc. for drinking.

Finally the beverage press may be fabricated using a translucent material for visualizing the liquid within the cylinder and cup.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 5 is an exploded isometric view of the pre-packaged beverage brewer press in the second embodiment for the pod cup cartridge.

FIG. 6 is a cross sectional view of the pre-packaged beverage brewer, taken on an imaginary cross section of the second embodiment for the pod cup cartridge.

FIG. 9 is a partial isometric view of the cylinder of the pre-packaged beverage brewer.

FIG. 10 is an underside view taken along lines 10-10 of FIG. 9 illustrating the bosses in the cylinder bottom for supporting the flexible top of a beverage cartridge.

FIG. 11 is a partial cross sectional view of the beverage brewer, taken on an imaginary cross section, illustrating the integral piercing needle.

FIG. 12 is a partial isometric view of the holder with the gripping surface having vertical ribs with or without sharp edges.

FIG. 13 is a partial isometric view of the holder with the gripping surface having knurling.

FIG. 14 is a partial isometric view of the holder with the gripping surface having a tab.

FIG. 15 is a partial isometric view of the holder with the gripping surface having a plurality of tabs for holding the holder upright.

FIG. 16 is a partial isometric view of the holder with the upright seating provisions having a skirt.

FIG. 17 is a cross sectional view of the holder, taken on an imaginary cross section, illustrating the surface bosses.

FIG. 18 is a cross sectional view of the holder, taken on an imaginary cross section, illustrating the surface bosses framing the exit hole.

FIG. 19 is a partial isometric view of the holder with the upright seating provisions having flanges.

BEST MODE FOR CARRYING OUT THE INVENTION

Figure 1:
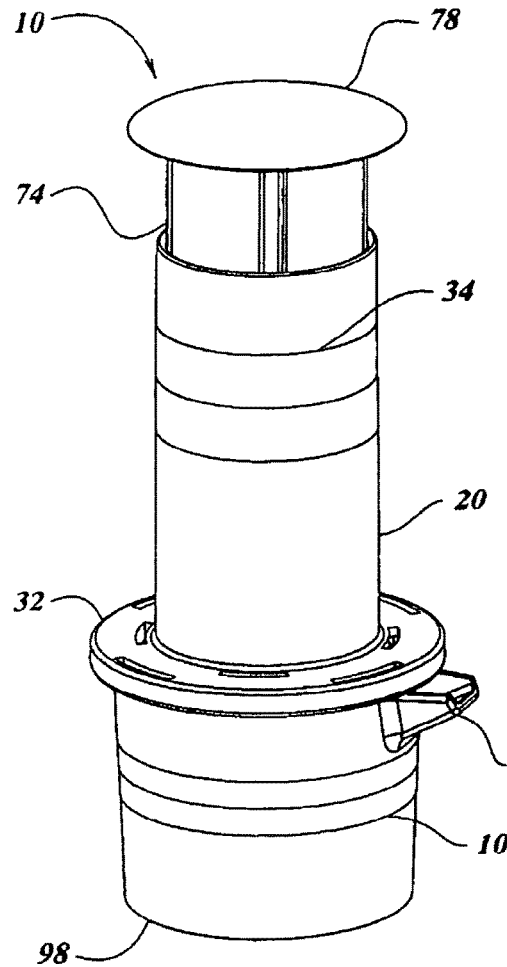
FIG. 1 is an isometric view of the pre-packaged beverage brewer press in the preferred embodiment.

The best mode for carrying out the invention is presented in terms of a preferred, second and third embodiment. The preferred embodiment is for the self contained beverage cartridge types having a cup with a thin flexible top cover requiring piercing from both top and bottom. The second embodiment is for use with a beverage cartridge penetrateble pod, and the third embodiment is directed to a pod cartridge having the brewing media totally covered by filter paper requiring no piercing.

The preferred embodiment is shown in FIGS. 1-4 1-3 along with FIGS. 9-19 and is comprised of a pre-packaged beverage brewer press 10 utilizing a hollow cylinder 20 which includes a full diameter body 22, an open top 24 and a bottom 26, with the bottom 26 having at least one centric opening 28. A number of cylinder bosses 30 extend from the cylinder stepped bottom 26, as illustrated in FIG. 10 for supporting a beverage cartridge flexible top. The cylinder 20 includes an outwardly extending base 32 on the bottom 26 for attachment purposes and to provide a flat surface for cylinder upright seating. Cylinder level markings 34 are provided on the outside surface of the cylinder 20 for indicating the amount of hot water contained within.

Figure 2:
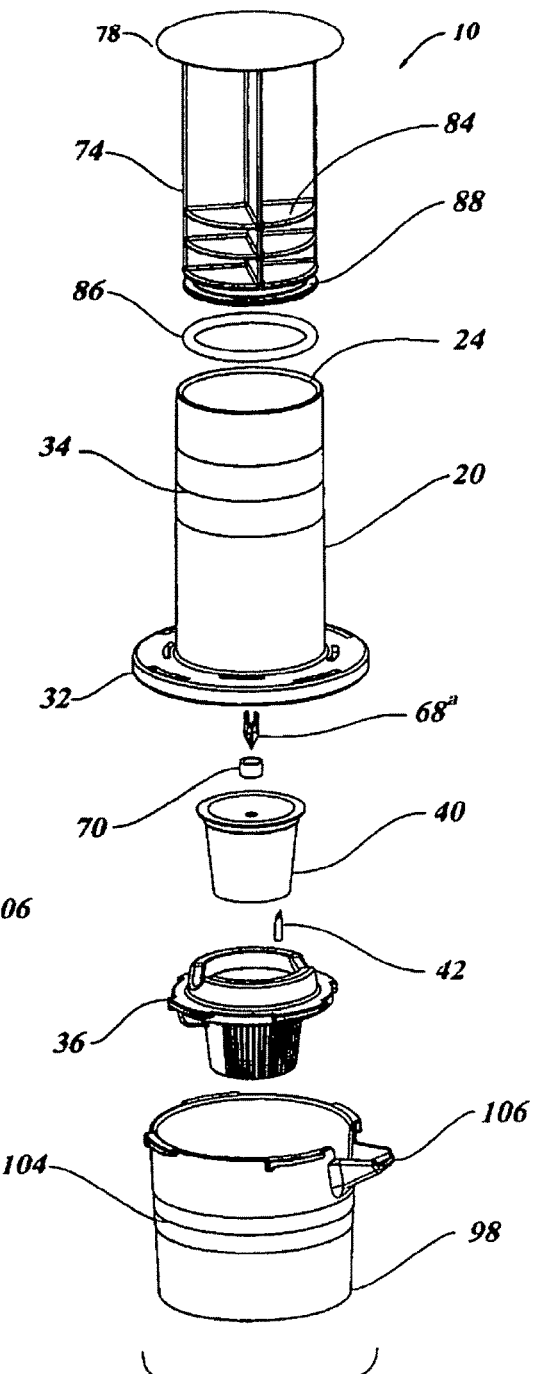
FIG. 2 is an exploded isometric view of the pre-packaged beverage brewer press in the preferred embodiment.
Figure 3:
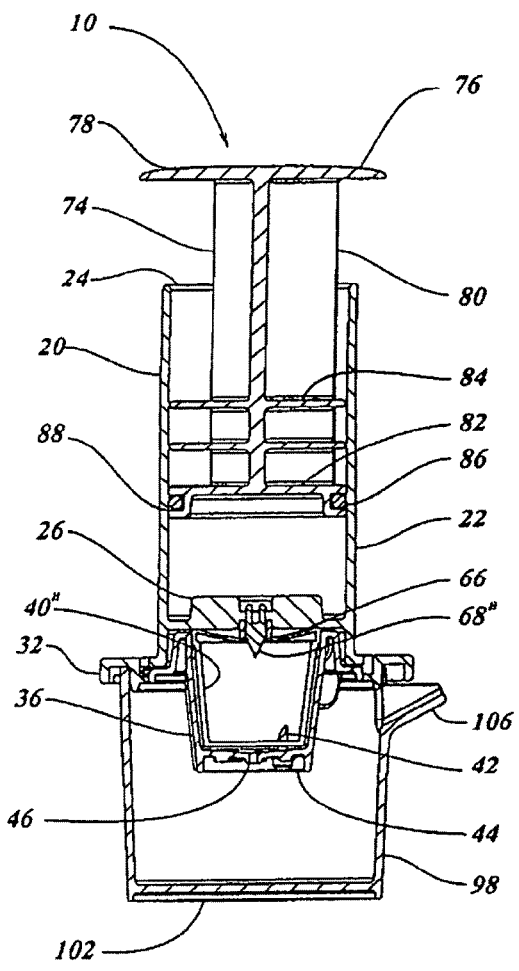
FIG. 3 is a cross sectional view taken on an imaginary cross section of the preferred embodiment having the K-CUP® cartridge compatible configuration.
Figure 4:
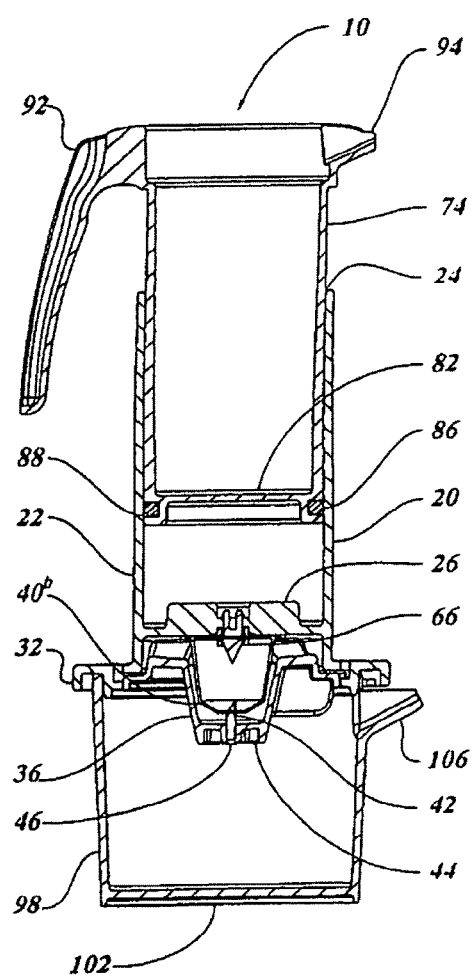
FIG. 4 is a cross sectional view taken on an imaginary cross section of the preferred embodiment having the NES-CAFE® cartridge compatible configuration.

A removable holder 36 engages the cylinder base 32 with holder ramped flanges 38, and is configured to retain and pierce the bottom of a beverage cartridge 40, with at least one bottom piercing needle 42 located in the holder bottom portion 44, as illustrated in FIGS. 2-4. The holder 36 also includes at least one exit opening 46 in the same bottom portion 44 and in the preferred embodiment the holder 36 is configured to be compatible with the well known and widely used K-CUP® cartridge 40$^a$ which consists of; a cup-shaped outer container with a bottom and a side wall extending to a circular rim with, the side wall tapered inwardly to a tapered ledge extending to a pierceable bottom wall, a cone shaped permeable filter containing a beverage medium contained within the holder body, and a pierceable cover is joined to the side wall circular rim permitting injection of a liquid into the filter and when steeped, a brew may flow from the bottom of the cartridge.

FIG. 4 illustrates compatibility with a NESCAFE® cartridge 40$^b$ which consists of; a cup-shaped outer container with a bottom and a side wall extending to a circular rim with, the side wall tapered inwardly to a centrally pierceable domed bottom wall, a permeable filter containing a beverage medium contained within the holder body, and a pierceable cover is joined to the side wall circular rim permitting injection of a liquid into the filter and when steeped, a brew may flow from the center of the domed bottom of the cartridge. Other similar cartridge, known, unknown or developed in the future, maybe used with a comparable holder 36.

Since the holder 36 is attached to the cylinder base 32 with ramped flanges 38 requiring a manual eighth twist, a gripping surface is essential which may include different basic approaches to accomplish the same end result. The selections include a number of vertical ribs 48, illustrated in FIG. 12 or the same vertical ribs with sharp edges 48$^a$, exterior knurling 50, depicted in FIG. 13, a single outwardly extending tab 52, shown in FIG. 3, or a pair of outwardly extending tabs 54, also shown oppositely in FIG. 14 or the multiple outwardly extending tabs 56 of FIG. 15.

In order to provide upright seating of the holder 36 for cleaning and if stored separately, the holder 36 may include the following; an extending skirt 58, shown in FIG. 16, a number of surface bosses 60 on a lower portion of the holder 36, illustrated in FIG. 17, at least one framing boss 62 surrounding the holder exit opening 46, illustrated in FIG. 18 or a plurality of downwardly extending flanges 64, depicted in FIG. 19.

At least one top piercing needle assemblage 66 extends from cylinder bottom centric opening 28 with the utility to both penetrate and seal the top of the beverage cartridge 40. There are two variations of the top piercing needle assemblage 66, the first utilizes one or more top piercing needles 68 formed integrally with the cylinder stepped bottom 26, shown in FIG. 3. The second variation of the top piercing needle assemblage, 66 consists of a separate top piercing needle 68$^a$, illustrated in FIG. 4 which penetrates the cylinder stepped bottom 26 in such a manner as to rotate within at the centric opening 28. Sealing is accomplished with a flexible tube 70 surrounding the top piercing needles 68 and 68$^a$ with the flexible tube 70 disposed within a tube recessed groove 72 in the cylinder bottom 26, illustrated in FIGS. 2 through 5. In either case the top piercing needle assemblage 66 is structured to permit hot water to pass through the at least one centric opening 28 easily.

A removable manually operated piston 74 is configured to be engaged within the cylinder 20 to create an air-tight seal and includes an outwardly extended top 76 for manually depressing the piston 74 into the cylinder 20.

There are two variations of the piston 74, the first is illustrated in FIGS. 1-3, where the piston outwardly extended top 76 is completely enclosed forming a domed top 78 and has struts 80 extending between the domed top 78 and a recessed circular bottom member 82, also a plurality of circular stabilizing ribs 84 are integrally formed into the struts 80. The recessed circular bottom member 82 incorporates a free floating O-ring 86 within an O-ring groove 88 configured to provide a nominally close-fitting seal between the piston 74 and the hollow cylinder 20 providing sufficient compression of air and liquid to force the liquid thru the beverage cartridge 40. The O-ring groove 88 has a depth inconsistent with the O-ring manufacturer's recommendations as it has been found that if the depth is slightly deeper the O-ring will float freely using it's original shape plus the water pressure to create a seal against the cylinder, and the downward force to create a seal against the top side of the piston groove to produce the optimum resistance allowing a user to easily operate the press.

Figures 7, 8:
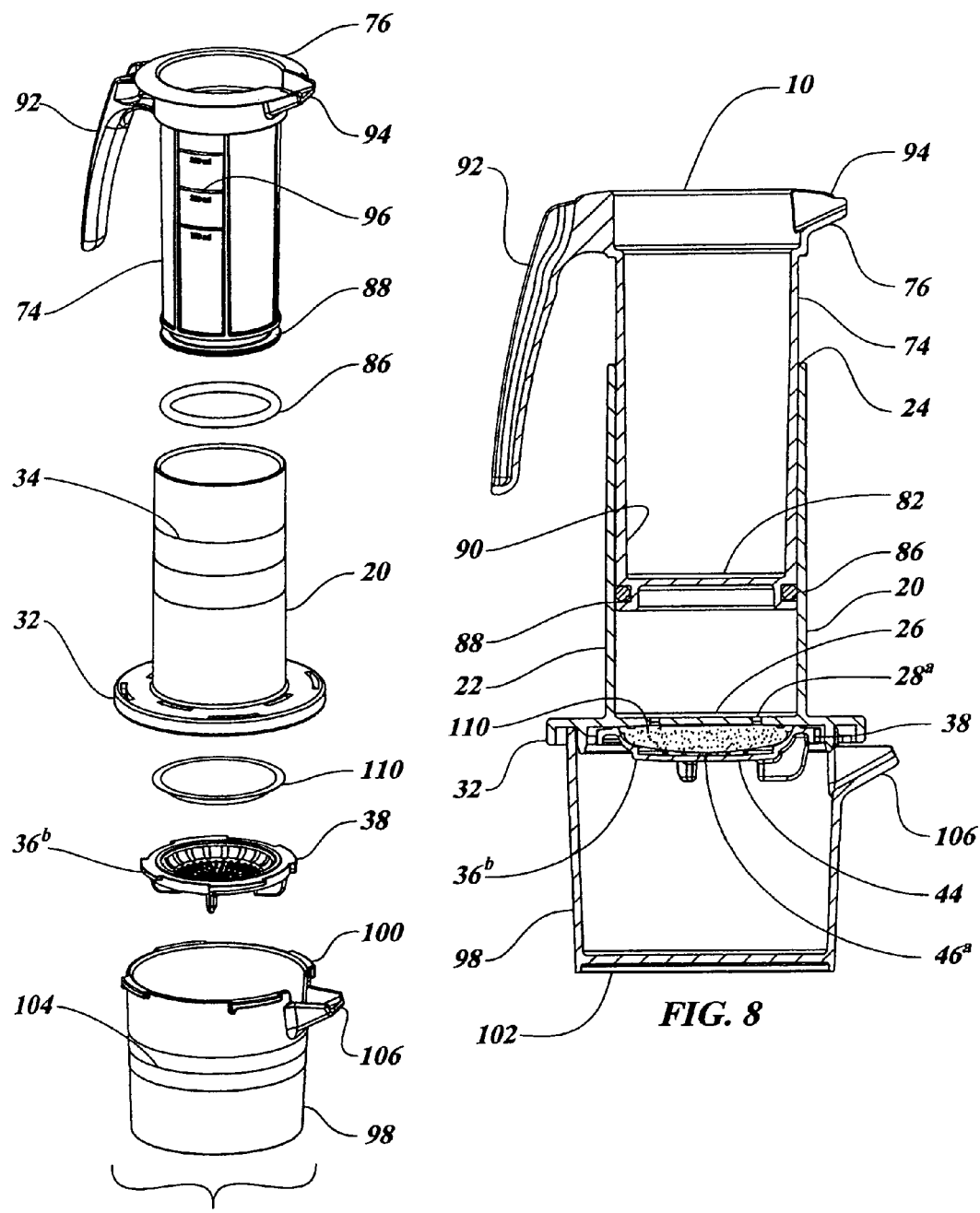
FIG. 7 is an exploded isometric view the pre-packaged beverage brewer press in the third embodiment for the pod cartridge.
FIG. 8 is a cross sectional view of the pre-packaged beverage brewer, taken on an imaginary cross section in the third embodiment for the pod cartridge.

The second variation of the piston 74, depicted in FIG. 4 through 8, utilizes a hollowed cylindrical shaped body 90 basically duplicating the hollow cylinder 20 except it has a diameter small enough to slide easily within the cylinder 20. The outwardly extended top 76 is centrally open, and includes a handle 92, and a piston spout 94. The bottom is enclosed with the same recessed circular bottom member 82, as described above, along with the same free floating O-ring 86. This variation also includes piston water level markings 96, as shown in FIG. 7, indicating the amount of hot water contained in the piston 74 when used to fill the cylinder 20.

A cup 98, illustrated in FIGS. 1-8, is attached with at least two cup ramped flanges 100 to the cylinder base 32, and has a wide flat base 102 on the bottom surface for standing evenly on a flat surface. A number of cup level markings 104 indicate the liquid volume of beverage or hot water, and a cup pouring spout 106 is included on the cup's top surface for transferring the hot water to the cylinder 20, and/or brewed beverage to a coffee or tea cup.

The second embodiment of the pre-packaged beverage brewer press 10 is for use with a beverage cartridge penetrateable pod 108, as shown in the drawings in FIGS. 5 and 6 which incorporate all of the same elements as the preferred embodiment, including the two piston variations, however, with the exception of the holder 36 which is now configured to be compatible with a beverage cartridge 40 defined as a pod 108 having a penetrateable upper surface and the holder 36$^a$. Further the at least one bottom piercing needle 42 located in the holder bottom portion 44 is not required in this second embodiment. This second embodiment may alternatively utilize an ejector pin 112 to manually expel the pod 108 from the holder 36$^a$.

The third embodiment of the pre-packaged beverage brewer press 10 is for use with a beverage cartridge pod 110 having the brewing media totally covered by filter paper, as shown in the drawings in FIGS. 7 and 8. The third embodiment incorporates all of the same elements as the preferred embodiment, including the two piston variations, however, with the exception of the holder 36 which is now configured to be compatible with a beverage cartridge, defined as a pod 110 and the holder 36$^b$. Further the top piercing needles 68, 68$^a$ and the at least one bottom needle 42 which is located in the holder bottom portion 44 are not required, also the least one opening 28 is more clearly defined as multiple openings 28$^a$ in this third embodiment.

In the preferred embodiment operation heated water is placed within the cylinder 20 and the piston 74 is inserted into the cylinder 20, when urged downwardly by a user, sufficient pressure is created to compress the water into the beverage cartridge 40 which has been penetrated and pierced permitting steeping therefore brewing a beverage discharged into the cup 98 beneath. The second embodiment operates in the same manner however while the penetrating of the cartridge top is accomplished, the piercing of the bottom is unnecessary and the penetrateable pod 108 is expelled by the ejector pin 112 when spent. The third embodiment operates like the second but the penetrating of the top of the pod 110 is not required.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:
1. A pre-packaged beverage brewer press which comprises:
   a self contained beverage cartridge having a thermoplastic cup with a thin flexible top cover requiring piercing from both top and bottom,
   a hollow cylinder having a full diameter body with a base, an open top and a bottom,
   a removable holder contiguously engaging said cylinder bottom, said holder having a configuration suitable to retain and pierce said bottom of said beverage cartridge, with said holder having an exit opening, at least one top piercing needle, extends from said cylinder, penetrating and sealing in concert said beverage cartridge top, a removable manually operated piston configured to be engaged within said hollow cylinder, said piston having an air-tight seal, a top, a handle, a spout, one piercing needle, and a cup, having a pouring spout, append to said cylinder bottom, a wide flat base on said bottom surface thereof for standing evenly on a flat surface, said cup is removably attached to said cylinder base on said bottom of said hollow cylinder with at least two cup ramped flanges, such that when heated water is placed within said cylinder and said piston is also inserted into said cylinder and urged downwardly by a user, sufficient pressure is created to compress said water into said beverage cartridge which has been penetrated and pierced permitting steeping therefore brewing a beverage which is discharged into said cup beneath.

2. The pre-packaged beverage brewer press as recited in claim 1 wherein said cup further comprises more than two level markings indicating volume of beverage or hot water contained therein, said cup also having a pouring spout on a top surface for transferring hot water to said cylinder and/or brewed beverage to a coffee or tea cup.

3. The pre-packaged beverage brewer press as recited in claim 1 wherein said cylinder further having more than two level markings indicating the volume of hot water contained within.

* * * * *